INVENTORS
Dieter MEHLITZ
Hans RÜHLE
Heinz THIELE

By Singer, Stern & Carlberg their ATTORNEYS

United States Patent Office 3,518,927
Patented July 7, 1970

3,518,927
PHOTOGRAPHIC CAMERA WITH ELECTRONIC SHUTTER AND REMOTE CONTROL DEVICE ATTACHABLE THERETO
Dieter Mehlitz, Stuttgart-Mohringen, Hans Ruhle, Stuttgart, and Heinz Thiele, Leinfelden, near Stuttgart, Germany, assignors to Zeiss Ikon Aktiengesellschaft, Stuttgart, Germany, a corporation of Germany
Filed Dec. 7, 1966, Ser. No. 599,925
Claims priority, application Germany, Dec. 9, 1965, Z 11,911
Int. Cl. G03b 7/08, 9/58; G01j 1/46
U.S. Cl. 95—10                                    8 Claims

ABSTRACT OF THE DISCLOSURE

A photographic camera equipped with an electronic shutter is detachably connected with a remote control device including a photoelectric exposure meter capable of adjusting not only the shutter speed but also the diaphragm of the photographic camera.

---

The invention relates to a photographic camera provided with an electronic shutter and a remote control device attachable to the camera, the electric control members of said remote control device being directly applicable to the electronic shutter and adjustable along adjustment scales for exposure factors, for instance shutter speed.

It is known to illuminate the object to be photographed with artificial light or to employ artificial light in addition to daylight. In such cases it is advisavle to measure the brightness of the object directly at the object because in this way errors caused by a wrong picture angle of the exposure meter can be avoided.

In order to make such a light measurement separately from the position of the camera and to introduce the measured exposure values into the camera, the present invention proposes to connect the remote control device of a camera of the type described above with an exposure meter consisting substantially of a photoconductive cell and a measuring instrument preferably combined to form a structural unit, and to couple the control member of the exposure meter for the exposure time and/or the diaphragm aperture with the corresponding members of the remote control device, for instance with the exposure time adjusting member of the remote control device.

If such a remote control device according to the present invention is connected to an exposure meter and its exposure time adjusting member is in some way coupled with that of the exposure meter, then the exposure time required for existing brightness can be adjusted from the remote control device without any manipulations on the camera itself. Since the remote control device is also connected with a release means, the exposure can be made immediately after the exposure time has been determined.

It is known that the exposure meter determines the light value under due consideration of the film speed of the film used, and this light value corresponds to a predetermined combination of diaphragm aperture and shutter speed, which factors, however, may vary in themselves as long as the light value determined by the exposure meter is met. Heretofore, the shutter speed was adjusted with respect to a preselected diaphragm value. If the camera is equipped, for instance, with a motor driven diaphragm aperture adjusting device, the remote control device may be provided with a suitable control member so as to adjust also the diaphragm value in compliance with the measured light value. If now an exposure meter is used which is connected with the remote control device, the invention proposes to couple a diaphragm adjusting ring on the exposure meter with the control member of the remote control device which causes the diaphragm adjusting motor in the camera to rotate in one or the other direction until the desired diaphragm aperture is adjusted. In order to become aware of this, the camera of the aforedescribed type is equipped with an indicating device in the form of signal lamps arranged in the remote control device.

It is known especially in a camera provided with an electronic shutter to control the latter by means of a photoconductive cell so that the automatic shutter operates according to the existing light conditions. It is a further object of the invention to combine such a photoconductive cell which is connectable with the electronic shutter, with the exposure meter which can be accomplished by disposing in it two separate photoconductive cells preferably having two separate electric measuring circuits. For the control of the additional measuring circuit in relation to exposure factors, as for instance diaphragm aperture and shutter speed or film speed, variable light reducing means are arranged in front of the photoconductive cell. In place of two separate photoconductive cells there may be employed a single one with a center tap, of which one portion is directly connected to the electronic shutter, while the other portion cooperates with the measuring instrument of the exposure meter. The light diminishing means may be disposed in front of both of the photoconductive cells so that the control of the measurement circuit in the exposure meter takes place optically rather than purely electrically or by mechanical control means.

It is, however, also possible to control with a single photoconductive cell selectively either the electronic adjusting means or the exposure meter. For this purpose the photoconductive cell arranged in the exposure meter is by way of example connected to a change-over switch which introduces the photocondutive cell into the circuit of the eletronic shutter or connects it to the measuring instrument of the exposure meter.

It is another object of the invention to provide the remote control device connected with the exposure meter additionally with a viewfinder which may have a variable picture angle to determine the section for which the light conditions are to be explored. The exposure meter connected with the remote control device may be constructed for an object measurement as well as for a light measurement. The latter one is then in order when the object to be photographed cannot be measured with respect to its brightness in its immediate proximity so that it is necessary to check the light sources directed onto the object, as for instance floodlights or other artificial light sources, for their illumination power.

The invention will be described in further detail with reference to the accompanying drawings, in which.

Figure 1:
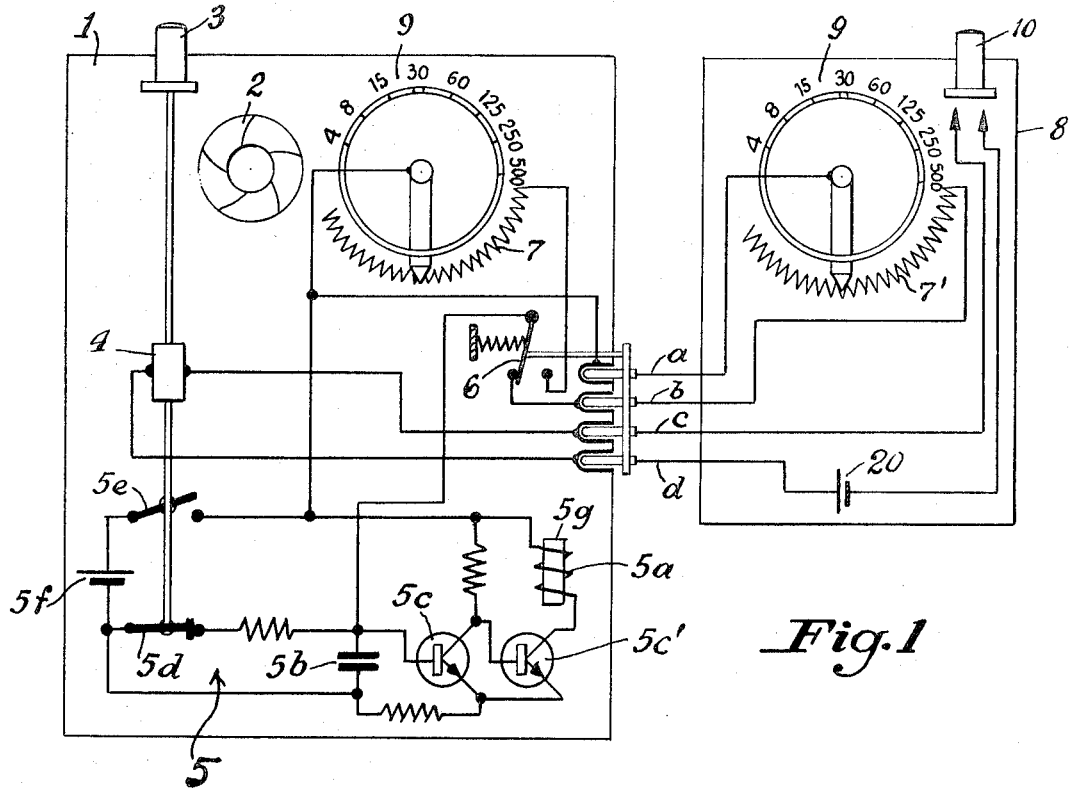
FIG. 1 illustrates diagrammatically a camera provided with an electronic shutter and an attachable remote control device.

Referring to FIG. 1, the diagrammatically illustrated photographic camera 1 is provided with a diaphragm adjusting means 2, a manual release 3 and a remotely controlled release 4. An electronic shutter 5, for example as disclosed in "Photo-Technik and Wirtschaft," Nov. 10, 1965, pages 439–440, by Horst W. Staubach, cooperates depending upon the position of the change-over switch 6 either with a resistance 7 in the camera or with a resistance 7' in the diagrammatically illustrated remote control device 8. The resistances 7 and 7' are of the same type and together with a capacitor form in the electronic shutter the RC-member required for producing the exposure time. The various exposure times are formed by a change of the resistances 7 and 7' along the time scale 9. When the remote control device 8 is connected to the camera, at that moment the resistance 7 is automatically disconnected from the electronic shutter 5 and the other resistance 7' is connected to it. The electromagnetic release device 4 is operated by a button 10 when the remote control device is used.

The electronic shutter operates as follows: Upon depressing the manual release 3 the latter closes an electric switch 5e and thereby a battery 5f is connected to an electromagnetic coil 5a and energizes the same. The core 5g of this coil 5a opens the shutter and holds it. At the same time a condenser 5b receives a charge from said RC circuit in the exposure meter since this RC circuit is arranged in series with the condenser 5b. Depending upon the intensity of illumination of a photoconductive cell arranged on or in the camera, this charging of the condenser 5b from said RC circuit requires a shorter or longer time. When the condenser 5b has reached its threshold value, a group of transistors 5c, 5c' block the flow of current to the electromagnet and the shutter closes. When the shutter is again tensioned, the switch 5e is opened and a switch 5d is closed so that the residual charge of the condenser 5b may flow off.

Figure 2:
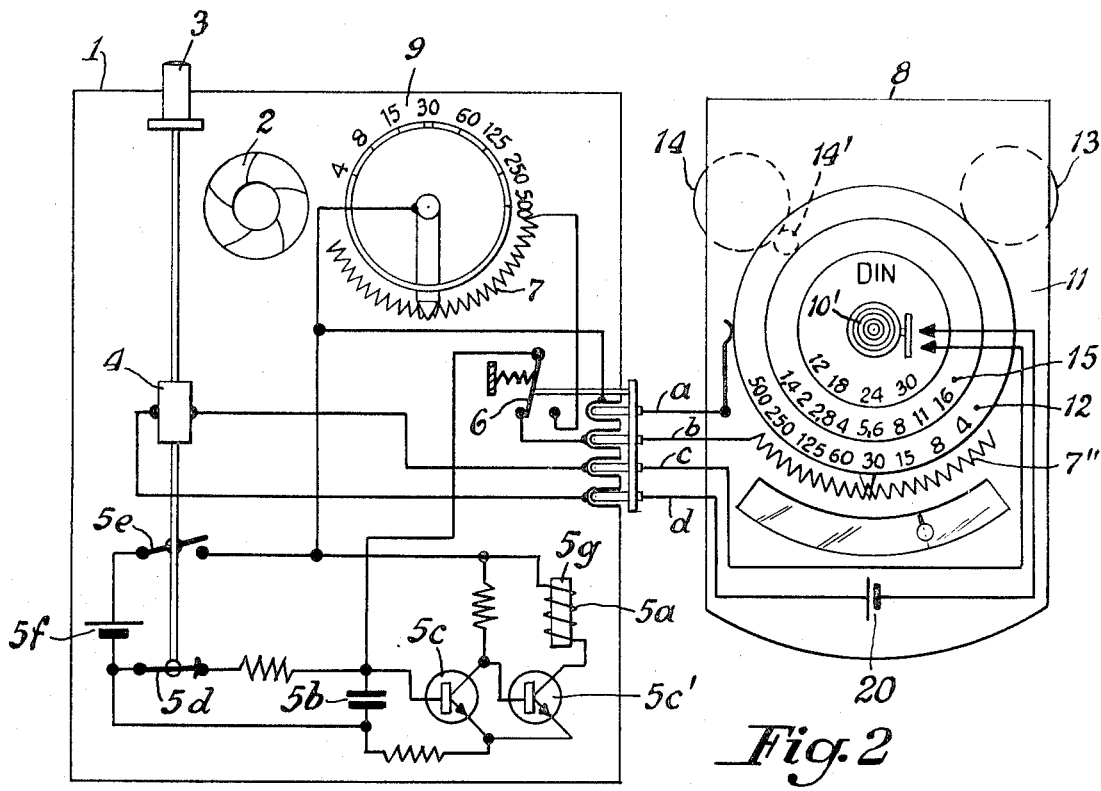
FIG. 2 illustrates diagrammatically a camera provided with an electronic shutter and an attachable remote control device combined with an exposure meter.

FIG. 2 shows that according to the present invention the remote control device 8 is connected with an exposure meter 11 which is provided with a follow-up pointer instrument, but other exposure meter systems may also be employed. Of importance for the present invention is merely that the exposure meter has at least one adjusting member for measuring the exposure time. The time setting ring 12 of the exposure meter 11 acts upon a resistance 7''. The adjustment of the time setting ring 12 is effected by a knurled ring 13. By means of an adjusting member 14 and a transmission member 14' the diaphragm ring 15 is adjusted to the diaphragm aperture value preselected on the camera 1. The remote release button is designated with 10' and is positioned in the center of the concentrically arranged exposure meter rings 12, 15.

It is assumed that the camera according to the present invention is a studio camera, being directed onto the object to be photographed, is in a stationary position. This camera is provided with a remote control device which is combined with an exposure meter.

With such a setup the brightness of the object to be photographed can be examined on the object itself which is especially important when a number of artificial light sources are employed for the illumination whose position has to be so selected that the desired illumination effect is obtained. For this purpose the exposure meter is in known manner adapted to be used for measurig the brightness of the object itself as well as for measuring the prevailing light conditions.

The invention is also applicable whenever a camera cannot be operated at the locale of its placement. For the aforedescribed light measurement on the object as well as in cases where the remote control device has to be operated at a greater distance from the object to be photographed, it may be expedient to combine the exposure meter with a viewfinder device which is provided with a variable picture angle in order to make a light measurement only for a certain interesting picture angle.

Figure 3:
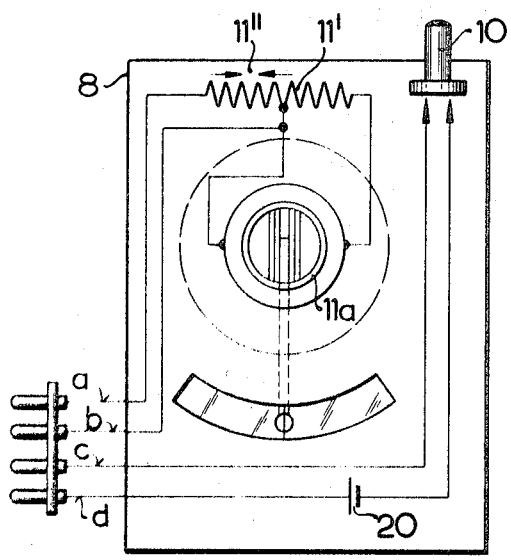
FIGS. 3 and 4 illustrate each diagrammatically other embodiments of the invention.

FIG. 3 illustrates the measuring instrument 11a of the exposure meter and illustrates that one half of the photoconductive resistance 11' is connected to the measuring instrument 11a, while the other left hand end of the photoconductive resistance 11' by means of the conductors a and b is connectible with the camera. The arrows 11'' indicate diagrammatically light weakening means, such as filters, which may be employed to introduce specific exposure factors in the measurement.

Figure 4:
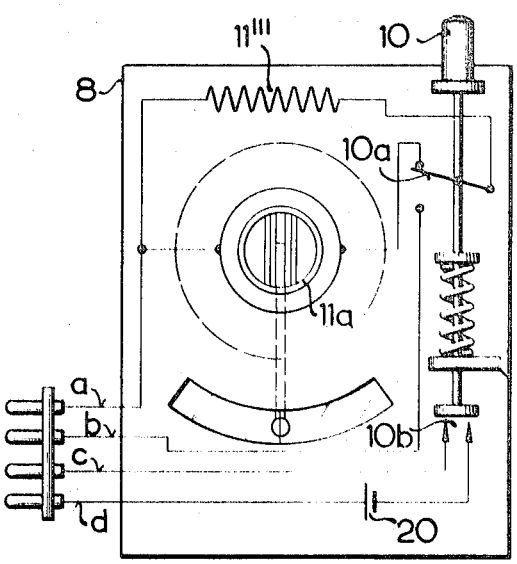

FIG. 4 illustrates a modification in which the photoconductive resistance 11''' is selectively connectible to the measuring instrument 11a of the exposure meter and to the electronic shutter which latter is arranged in the camera. When the release button 10 remains untouched, as illustrated in FIG. 4, the photoconductive resistance 11''' is connected to the measuring instrument 11a and the exposure meter is complete and ready for a light measurement. When the button 10 is partly depressed, a switch 10a actuated thereby is moved to another position—namely after the light measurement—in which the photoconductive resistance 11''' is connected with the electronic shutter by means of the conductors a and b to operate the same. Upon a further depression of the button 10 the remote control is rendered operative in that the conductors c and d are connected at 10b with each other and the camera is released by the release magnet 4 (see FIG. 1).

In the aforedescribed embodiments of the invention it was assumed that the diaphragm of the camera was manually preadjusted to the desired aperture. If, however, the camera is equipped with, for instance, a motor driven diaphragm adjusting device and if the diaphragm adjusting motor in known manner is controlled by variable resistances, then in accordance with the invention one of these variable resistances is adjusted on the remote control device along the diaphragm aperture scale of the exposure meter.

The diaphragm mechanism on the camera is hereby adjusted according to the principle of the follower control device. According to FIG. 5, in which the conductors between the camera and the remote control device 8 are illustrated as double conductors e, f; a', b'; c', d' and g, h, the diaphragm aperture adjusting ring 15 on the remote control device is operated by the manually rotatable wheel 14 and adjusts the potentiometer 16 for taking therefrom a predetermined voltage. On the camera or on the shutter, respectively, is arranged another potentiometer 17. If now the potentiometer 16 on the remote control device is adjusted, then depending upon the direction of adjustment either a positive or a negative voltage difference is produced between the potentiometer 16 and the potentiometer 17. This potential, which may be amplified, controls the adjustment motor 18 depending upon its sign in one or the other direction until the desired diaphragm aperture is adjusted. At that moment the potential of the adjustment motor is reduced to zero. The proper adjustment of the diaphragm aperture in conformance with the prevailing light conditions is indicated in the remote control device by means of a signal lamp 19.

Figure 5:
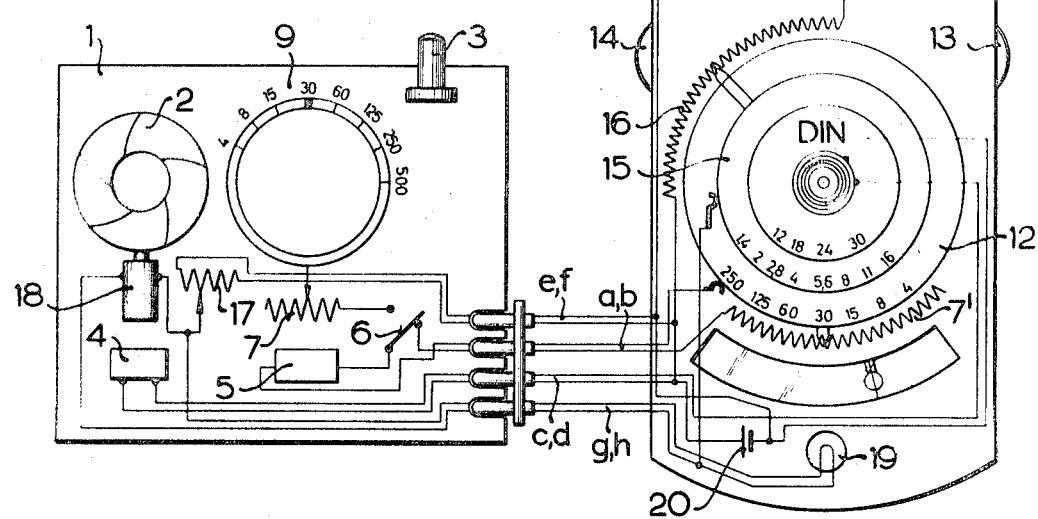
FIG. 5 illustrates diagrammatically still another embodiment of the invention, and the FIGS. 6 and 7 explain the operation of the modification illustrated in FIG. 5.
Figure 6:
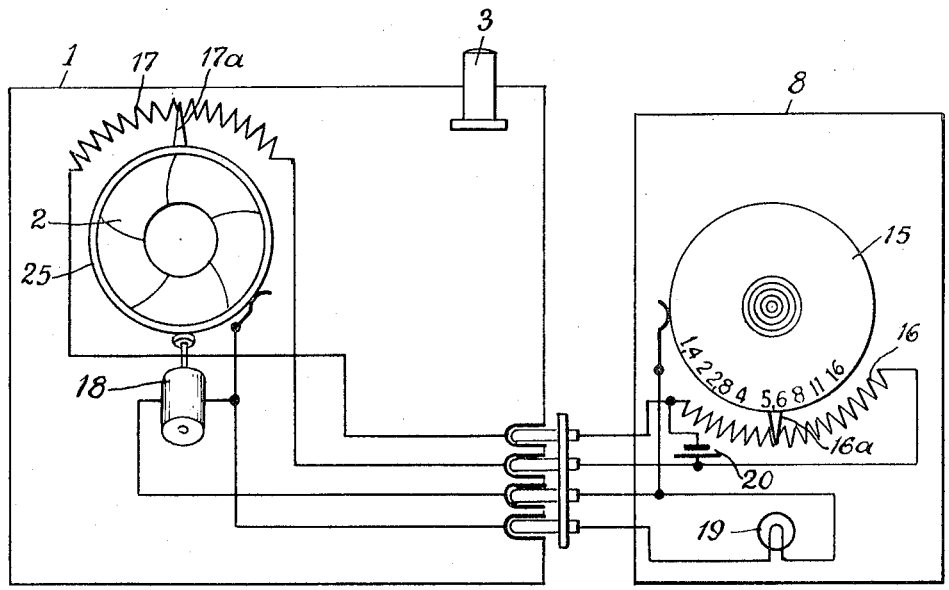
Figure 7:
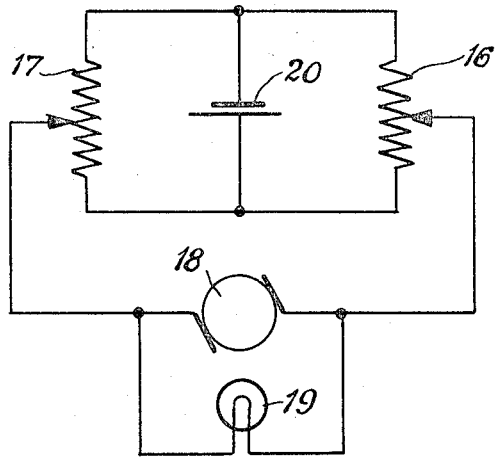

For a better understanding of the modification of FIG. 5 attention is called to FIG. 6. When the electric motor 18 rotatably adjusts the diaphragm adjusting ring 25 on the camera 1, the movable contact member 17a of the resistance 17 is also adjusted thereby. In the remote control 8 the movable contact member 16a of the resistance 16 is adjusted by the diaphragm adjusting ring 15. The resistances 16 and 17 and the battery 20 are arranged parallel to each other (see FIG. 7). If the resistances are not balanced with reference to each other, a differential voltage energizes the motor 18 and operates the same in one or the other direction of rotation so as to adjust the diaphragm on the camera. As long as any voltage is applied to the motor 18, the lamp 19 arranged parallel to the motor 18 lights up. If the remote control 8 is separated from the camera 1, the camera diaphragm 2 has to be manually adjusted and this is made possible by placing a friction clutch in the drive connection between the motor 18 and the diaphragm 2.

What we claim is:

1. A photographic camera with a shutter of the type including means forming an electric circuit for controlling the exposure period, said electric circuit being mounted in the shutter housing and including a first variable resistance means for determining the duration of the exposure period, said electric circuit being adapted to be controlled in a first condition by a first control means mounted on the shutter housing and connected to the said first variable resistance means, said shutter including means for electrically disconnecting the electric circuit from the first variable resistance means and electrically connecting the electric circuit to a second variable resistance means remote from the shutter housing for determining the duration of the exposure period, said electric circuit being also adapted to be controlled in a second condition by a remote control means from the said shutter housing and connected to the second variable resistance means, an exposure meter associated with said remote control means and comprising a photoconductive cell, a measuring instrument and control members for the exposure time and the diaphragm aperture, and means coupling said control members of said exposure meter with the corresponding electric members of said remote control means.

2. A photographic camera according to claim 1, in which said remote control means is provided with an adjustment member adapted to be electrically coupled with a motor driven adjusting device for the diaphragm aperture, and that said exposure meter includes a diaphragm adjusting ring which is connected with the diaphragm control member of said remote control means.

3. A photographic camera according to claim 1, in which said exposure meter is provided with two photoconductive cells of which one is directly connectable to said electronic shutter, while the other photoconductive cell cooperates with the measuring instrument of said exposure meter, at least one of said photoconductive cells having arranged in front of it adjustable light reducing means for the introduction of exposure factors.

4. A photographic camera according to claim 1, in which said exposure meter is connected with a viewfinder.

5. A photographic camera according to claim 1, in which a single photoconductive cell is used which by means of a change-over switch is connectable to the electronic shutter and to the measuring instrument of the exposure meter.

6. A photographic camera according to claim 1, in which said exposure meter is connected with a viewfinder having a variable picture angle.

7. A photographic camera according to claim 1, in which said exposure meter is provided with a photoconductive cell provided with a center tap dividing said cell in two portions of which one portion is directly connectable with said electronic shutter and the other portion cooperates with the measuring instrument of said exposure meter, at least one of said portions of said photoconductive cell having arranged in front of it adjustable light reducing means for the introduction of exposure factors.

8. A photographic camera according to claim 1, in which the camera is provided with an electromagnetic release device and said remote control device with a button operating said camera release device.

References Cited

UNITED STATES PATENTS

| | | | |
|---|---|---|---|
| 3,065,387 | 11/1962 | Dean | 95—53 XR |
| 3,348,460 | 10/1967 | Schmitt | 95—53 XR |
| 2,978,970 | 4/1961 | Fahlenberg. | |
| 3,122,978 | 3/1964 | Blieske. | |
| 3,442,190 | 5/1969 | Erickson. | |

NORTON ANSHER, Primary Examiner

J. F. PETERS, Jr., Assistant Examiner

U.S. Cl. X.R.

95—53, 64